(12) United States Patent
Marks et al.

(10) Patent No.: US 8,415,635 B2
(45) Date of Patent: Apr. 9, 2013

(54) PARTICLE-COUNTING APPARATUS WITH PULSE SHORTENING

(75) Inventors: Aviv Marks, Haifa (IL); Tuvia Liran, Haifa (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/682,269

(22) PCT Filed: Oct. 9, 2008

(86) PCT No.: PCT/IB2008/054139
§ 371 (c)(1),
(2), (4) Date: Apr. 9, 2010

(87) PCT Pub. No.: WO2009/050619
PCT Pub. Date: Apr. 23, 2009

(65) Prior Publication Data
US 2010/0207027 A1  Aug. 19, 2010

(30) Foreign Application Priority Data
Oct. 18, 2007  (CN) .......................... 2007 1 0181189

(51) Int. Cl.
*H01L 27/146* (2006.01)
(52) U.S. Cl.
USPC .................................................. 250/370.09

(58) Field of Classification Search ............ 250/370.01–370.15, 362, 363.01–363.1; 378/98.8
See application file for complete search history.

(56) References Cited

U.S. PATENT DOCUMENTS

| 4,612,443 | A  | 9/1986 | Alcidi |
| 4,658,216 | A  | 4/1987 | Goulding et al. |
| 6,291,825 | B1 | 9/2001 | Scharf et al. |
| 6,587,003 | B2 | 7/2003 | Jordanov |
| 2007/0158551 | A1 | 7/2007 | Audebert et al. |

FOREIGN PATENT DOCUMENTS

| GB | 2332513 A | 6/1999 |
| WO | 2001016620 A1 | 3/2001 |

OTHER PUBLICATIONS

Barlag et al., "A 16 channel VLSI chip, containing charge amplifier and analog to digital converter, for readout of highly granular particle detectors," 1998, Nuclear Instruments and Methods in Physics Research A, vol. 406, pp. 299-306.*

* cited by examiner

*Primary Examiner* — Kiho Kim

(57) ABSTRACT

A particle-counting apparatus is described, which reduces a resulting width of pulses when a charge pulse is received from a particle detector, thereby reducing pile-up problems with pulses. Pulse shortening is obtained by resetting the pulse shortly after it exceeds its peak level at the apparatus output. The apparatus includes a charge-sensitive amplifier and a shaper which generates an output for subsequent discrimination circuits. A reset generator monitors the shaper output and generates a reset signal to the shaper when a peak has been detected.

20 Claims, 6 Drawing Sheets

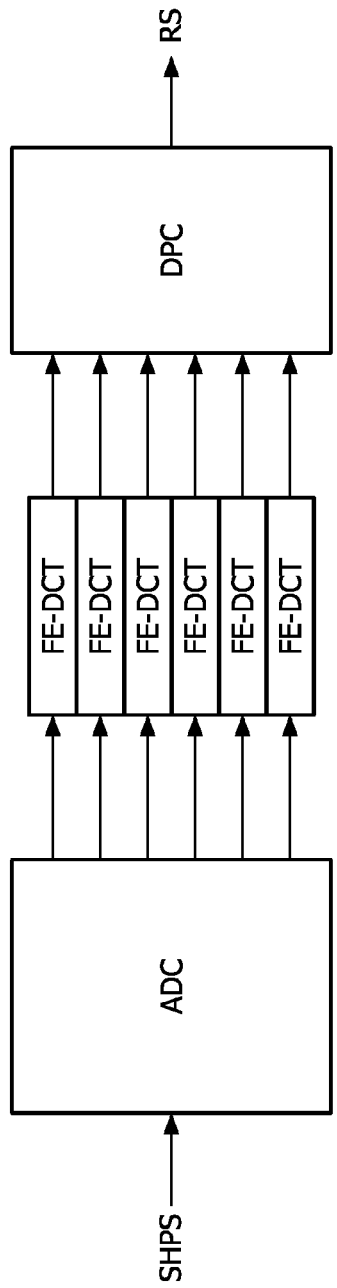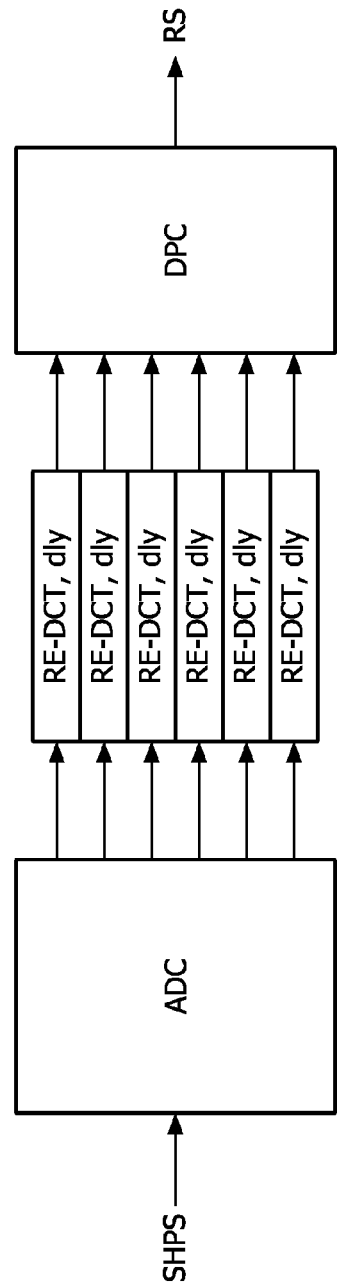

PARTICLE-COUNTING APPARATUS WITH PULSE SHORTENING

FIELD OF THE INVENTION

The invention relates to the field of particle counting, such as photon counting. More specifically, the invention relates to the field of high-rate photon-counting systems and their control systems, such as for use in e.g. Computer Tomography X-ray Imaging.

BACKGROUND OF THE INVENTION

Particle or photon counting or particle-counting techniques are well-known, e.g. in nuclear physics, astronomy, medical imaging, security, etc. These techniques are usable for detection and measurement of high-energy photons or particles of X-rays, Gamma-rays and ionized particles, etc. A detection system based on detector devices and dedicated readout circuits is used to amplify the photocurrent or photovoltage of the detectors, shape them, and make them ready for discrimination by analog-to-digital converters, or by comparing the pulse amplitude with known threshold levels.

Within high-quality image capturing, such as in medical imaging by computer tomography, a very high photon count rate is required to provide a wide dynamic range in the images. In spite of high-speed digital processing equipment, an inhibiting factor in achieving a high dynamic range is the problem that particles captured by a detector provide an electric pulse having a considerable width, i.e. a considerable temporal extension. Thus, a particle may be captured by the detector when a particle pulse captured earlier is still within its decay time, and, consequently, the particle pulse captured later may not be detected at all and thus has a limit for the maximally detectable particle rate, thereby also limiting the available dynamic range for the subsequent image-processing operation. The reason is that it is difficult for the subsequent counting circuits to discriminate such particles captured closely spaced in time, since in the electric signal the pulse from the particle captured later may more or less overlap or mask the pulse from the earlier particle. This problem is known as the pile-up effect.

The pile-up problem is addressed, for example, in GB 2 332 513 A which discloses a nuclear spectroscopy system in which pile-up is detected. A pulse length compensation, i.e. shortening or lengthening the pulse shortening or pulse widening, can then be performed with the object of keeping the pulse shape constant. The method described in GB 2 332 513 A solves the problem of providing a constant pulse shape also in the case of pile-up. However, the pile-up problem itself is not solved, and, consequently, the count rate is not improved.

OBJECT AND SUMMARY OF THE INVENTION

It is an object of the invention to provide a particle-counting system having an improved counting rate and thus being suitable for applications requiring a high dynamic range, such as medical imaging.

In a first aspect, the invention provides a particle-counting apparatus arranged to receive an electric input signal from an associated particle detector, the apparatus comprising:
 a charge-sensitive amplifier arranged to receive the input signal and generate an amplified signal in response,
 a shaper arranged to receive the amplified signal and generate a shaped signal in response, and
 a reset generator arranged to detect a peak in the shaped signal and generate a reset signal, such as a pulse, to the shaper upon detection of the peak, so as to reduce temporal extension of the shaped signal in response to a pulse in the electric input signal.

Such an apparatus, which can be used for particle counting front-end, provides the possibility of a high counting rate, since the pile-up problem is solved already early in the processing chain following immediately after the particle detector. Especially in embodiments in which a reset signal is applied to both the charge-sensitive amplifier and the subsequent shaper, it becomes possible to influence properties of the charge-sensitive amplifier and the shaper once a peak in the shaped signal has been detected, so that their time constants can be reduced, thereby shortening the pulse at the shaper output. This renders it possible to detect two pulses within a shorter time interval, and the probability of pile-up is thus reduced. By preferably applying the reset signal to both the charge-sensitive amplifier and the shaper simultaneously, it is possible to perform a fast resetting process because time constants of both circuits can then be reduced in response to the reset signal. The end result of the apparatus in accordance with the first aspect is that subsequent discrimination and counting of single pulses is facilitated, and a higher particle counting rate becomes possible.

In some embodiments, the reset generator generates a reset signal to both the shaper and the charge-sensitive amplifier simultaneously. The reset signal may be the same reset signal applied to both the shaper and the charge-sensitive amplifier.

The invention in accordance with the first aspect is based on the insight that the front-end circuit for a counting system is supposed to generate a pulse having an amplitude which is proportional to the total charge of the pulse. The peak of the pulse is thus important, while the decay of the pulse is unimportant.

The reset generator may be implemented with either analog or digital components, or with a combination thereof.

In some embodiments, the reset generator includes an analog-to-digital converter, such as a flash analog-to-digital converter or a discriminator which receives the shaped signal and generates a digital output to a digital processor circuit which is then arranged to analyze the shaped signal and generate the reset signal in response thereto.

In other embodiments, the reset generator includes a delay line arranged to generate a delayed version of the shaped signal, and a comparator arranged to generate the reset signal based on comparing the shaped signal and the delayed version of the shaped signal. The comparator may include a hysteresis element.

The reset generator may generate one common reset signal to be applied to both the charge-sensitive amplifier and the shaper, or it may generate different reset signals for the charge-sensitive amplifier and the shaper.

Detection of a peak in the shaped signal may be implemented as known in the art. It is preferred that the peak detection is fast and reliable so that the reset signal can be generated quickly after the peak has occurred in the shaped signal, so as to provide the possibility of beginning a shortening process as quickly as possible thereafter.

In preferred embodiments, the charge-sensitive amplifier exhibits a first integrator time constant during normal operation and is arranged to switch to a second integrator time constant in response to the reset signal, the second integrator time constant being shorter than the first integrator time constant. The apparatus may include a switch arranged to switch between first and second integrator networks in response to the reset signal. Specifically, the first integrator network may include a first resistor, the switch being connected so as to connect or disconnect a second resistor in response to the reset signal. In these embodiments, a shift of time constant from an initial high value to a lower value will serve to provide a quicker decay, once a pulse in the shaped signal has reached its peak value. In the specific embodiment, in which an integrator resistor is switched, a simple implementation of the pulse shortening is obtained.

The apparatus preferably includes switches arranged to change time-constant properties of both the charge-sensitive amplifier and the shaper in response to the reset signal. Thus, in accordance with the explanation in the above section, it is preferred that time constants of both the charge-sensitive amplifier and the shaper are changed towards lower values so as to effectively shorten the pulse in the shaped signal. Specifically, the switches may be arranged to change resistances in respective RC networks for the charge-sensitive amplifier and the shaper in response to the reset signal. More specifically, the time constants of both the charge-sensitive amplifier and the shaper are reduced, in response to the reset signal, to time constants that are reduced significantly relative to time constants during normal operation. In this context, the skilled person will know how to reduce the time constants during reset relative to time constants during normal operation.

In a second aspect, the invention provides a particle-counting system including
  a particle-counting front-end in accordance with the first aspect, and
  a counter arranged to receive the shaped signal from the front-end and discriminate between particle pulses based thereon. The system may further include a particle detector, such as a photon detector.

In a third aspect, the invention provides a scanner including
  a particle detector,
  a particle-counting system in accordance with the second aspect, and
  a signal processor arranged to receive a signal from the counter and generate data representing an image based thereon. The scanner may specifically be one of: a CT scanner, an X-ray scanner, etc.

It is appreciated that embodiments and advantages mentioned for the first aspect apply as well for the second and third aspects. Furthermore, it is appreciated that the aspects may be combined in any way.

BRIEF DESCRIPTION OF THE DRAWINGS

Embodiments of the invention will now be described, by way of example only, with reference to the drawings, in which
FIGS. 7a and 7b illustrate embodiments in which the reset generator is implemented digitally.

DESCRIPTION OF EMBODIMENTS

Figure 1:
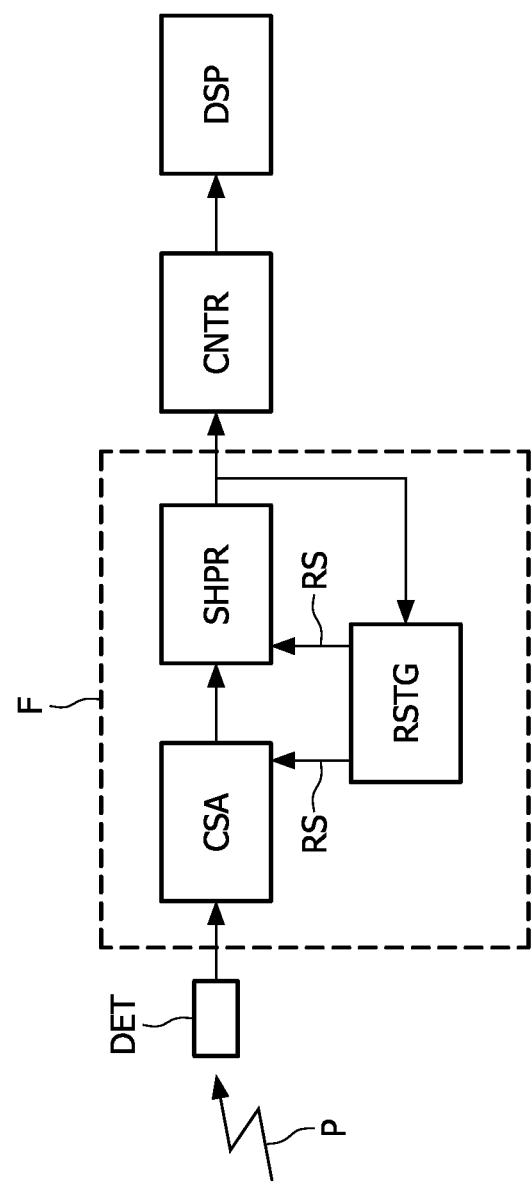
FIG. 1 illustrates an embodiment of a particle-counting system.

FIG. 1 illustrates an embodiment of a particle-counting system, such as for use in a medical scanner. A particle or photon P (hereinafter referred to as 'particle' only) is captured by a detector DET. The detector generates an electric signal in response to the captured particle P, and this signal is applied to a particle-counting front-end F. The front-end F includes a charge-sensitive amplifier CSA that receives the electric signal from the detector DET. The charge-sensitive amplifier CSA has at least one integrator with a time constant associated therewith, such that the charge-sensitive amplifier CSA has a well-defined rise time and decay time. A shaper circuit SHPR receives the amplified signal from the charge-sensitive amplifier and generates a shaped signal in response thereto. The shaper SHPR also includes an integrator with a time constant associated therewith and may further include a switchable RC network with another time constant associated therewith. The shaped signal from the shaper SHPR forms the output of the front-end F.

In embodiments of the invention, the front-end F further includes a reset generator RSTG that monitors the shaped signal with the purpose of detecting a peak in the signal, which indicates that a particle has been captured by the detector DET. When a peak has been detected, the reset generator RSTG generates, in response, a reset signal RS to both the charge-sensitive amplifier CSA and the shaper SHPR. The same reset signal RS may be applied simultaneously to both the charge-sensitive amplifier CSA and the shaper SHPR. In order to shorten the temporal extension of the pulse in the shaped signal, both the charge-sensitive amplifier CSA and the shaper SHPR are arranged to reduce their integrator time constants in response to the reset signal RS. The resulting total decay time for the front-end F is thus lowered, thereby causing a shortening of the resulting pulse in the shaped signal as compared to the conventional fixed integrator time constants. A larger number of pulses can thus be detected without pile-up problems.

A particle counter CNTR receives the shaped signal and counts the number of particles based thereon, and this task is facilitated due to the shortened pulses in the shaped signal, so that a higher particle rate can be detected. The detected number of particles is further processed by a processor DSP, such as a digital signal processor. The processor DSP may then generate an image based thereon, e.g. in case the particle-counting system is part of a medical scanner.

Figure 2:
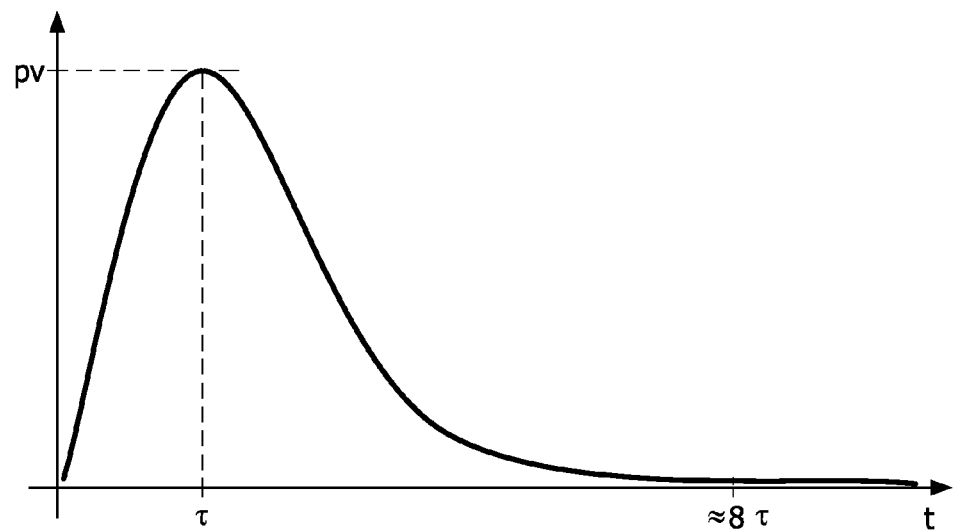
FIG. 2 illustrates a typical pulse shape at the output of the shaper.

FIG. 2 illustrates an example of an output of the shaper SHPR, i.e. the shaped signal as a function of time t. The front-end has an effective integrator time constant $\tau$ which is longer than the input pulse width, in order to enable complete integration of the charge from the detector DET. This means that a peak value pv in the shaped signal occurs at time $\tau$ after the electric pulse has been output by the detector DET, due to the rise time of the integrator. With the integrator time constant $\tau$, the shaped signal will then decay rather slowly after the peak value has been obtained, and the level will first come close to zero value after approximately eight times the time constant $\tau$, as illustrated. In this rather long period of time, sensitivity in the detection of another incoming charge is reduced, because the level has still not settled to zero, or is below a detection threshold for detecting particles. Particularly, detection is of course difficult if another pulse arrives temporally close to the time at which the first pulse reaches its peak value. Such cases, in which several pulses are received during the integrator decay time, are known as pile-up problems.

Figure 3:
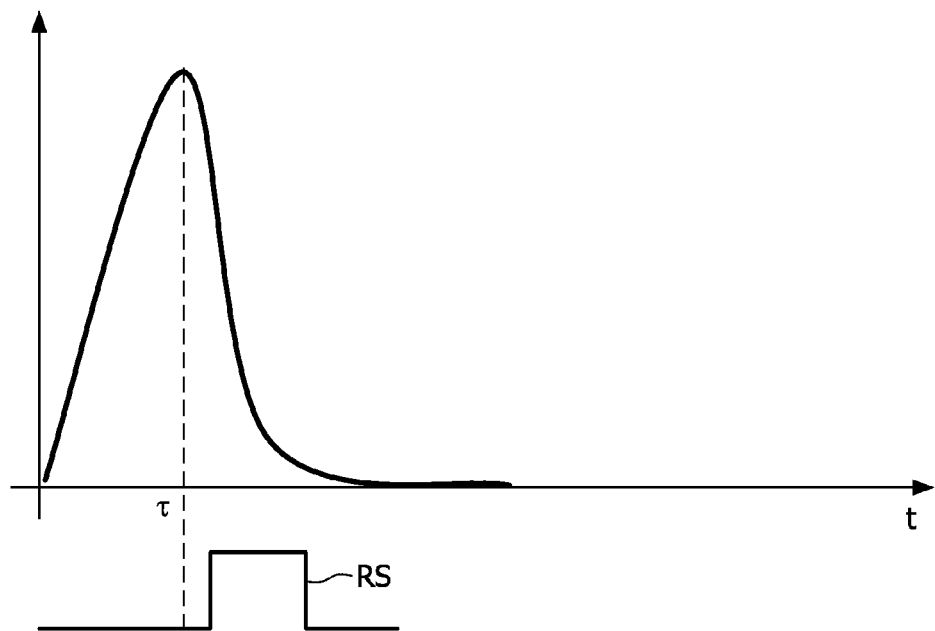
FIG. 3 illustrates a shortened pulse.

FIG. 3 illustrates the effect of the invention as described above, e.g. for FIG. 1. The incoming charge from the detector DET is assumed to be the same as in the example of FIG. 2. FIG. 3 illustrates the shaped signal plotted on time axis t, and the level of a reset signal RS generated by the reset generator RSTG is plotted on the same time axis. When the pulse starts, the rise time is assumed to be τ, likewise as in FIG. 2. The peak value thus occurs at time τ. However, the reset generator has detected the occurrence of a peak, and shortly after this occurrence, a reset signal RS is generated, here illustrated as a value switching from one value to another for a period of time. The charge-sensitive amplifier CSA and the shaper SHPR switch integrator time constants to lower values in response to the reset signal, and, as illustrated, the shaped signal is considerably shortened as compared to FIG. 2, so that a much faster and reliable detection of another incoming pulse is possible, thereby reducing the risk of pile-up.

Figure 4:
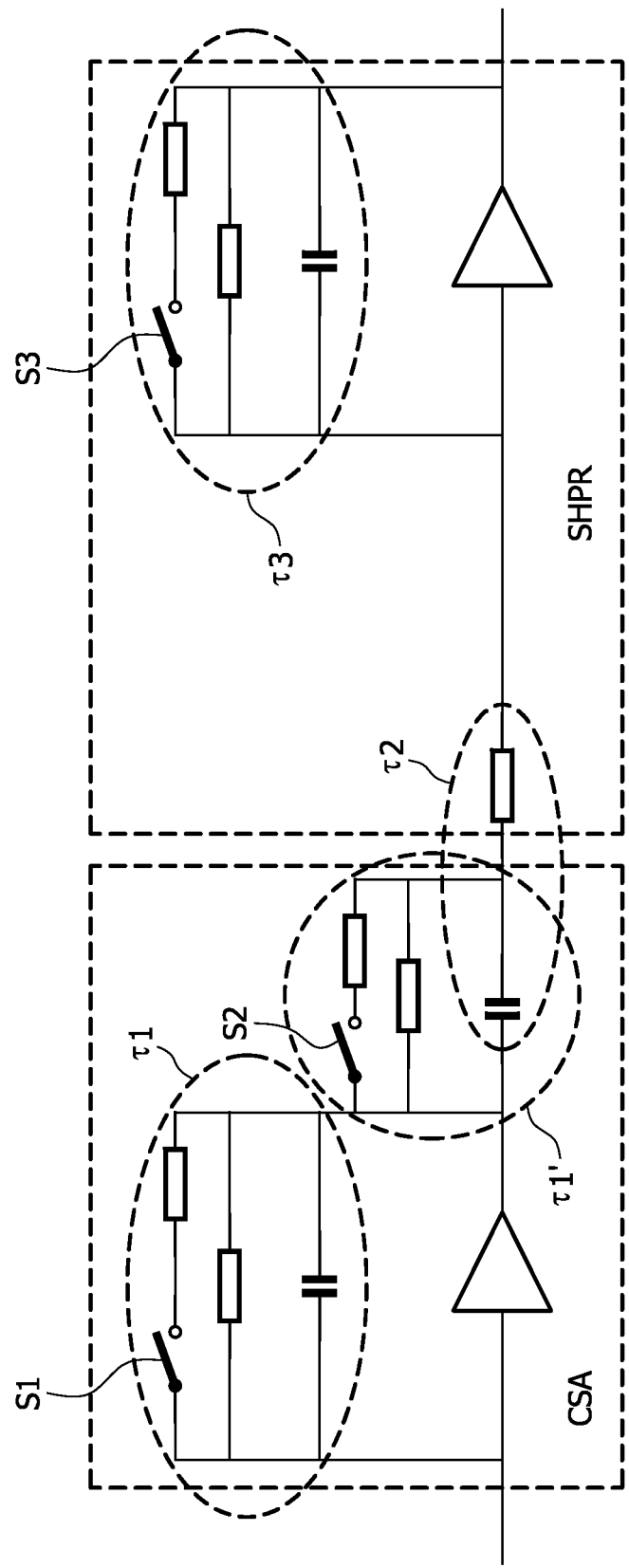
FIG. 4 illustrates an embodiment of a particle-counting front-end, based on a charge-sensitive amplifier with a pole-zero compensation circuit and a shaper based on a first-order low-pass filter.

FIG. 4 illustrates charge-sensitive amplifier CSA and shaper SHPR parts of a preferred embodiment of a particle-counting front-end. The charge-sensitive amplifier CSA has an integrator with a time constant τ1. This time constant τ1 is determined by a parallel connection of a capacitor and a resistor. A pole-zero compensation circuit is included for the purpose of reducing undershoots, and this compensation circuit has a time constant τ1' which is preferably equal or at least approximately equal to τ1. The pole-zero compensation circuit is also implemented as a parallel connection of a resistor and a capacitor. Furthermore, the circuit includes a differentiator with time constant τ2. Yet another time constant τ3 is associated with an integrator which is part of the shaper SHPR. This integrator of the shaper SHPR is also implemented as a parallel connection of a resistor and a capacitor. An optional current gain may be included between the differentiator and the integrator of the shaper.

As is shown, the circuit of FIG. 4 has three two-state switches s1, s2, s3 so as to electrically connect a further resistor in parallel with the resistors forming part of the three integrators. All of these switches s1, s2, s3 are in the "off"-state, i.e. with pulse shortening being inactive, thus illustrating the circuit in its normal operation mode. However, in response to a reset signal generated by the reset generator (not illustrated), all of the three switches s1, s2, s3 will switch to "on", i.e. the pulse-shortening mode, and thus connect the three further parallel resistors. The resulting resistances in all of the three RC circuits are thus lowered, thereby reducing the time constants of the integrators. As a result, the effective time constant of the entire front-end circuit is reduced, and a fast settling at the output of the shaper SHPR is achieved, as described above. After settling, the switches s1, s2, s3 are turned back to "off".

In the pulse-shortening mode, a small unbalance in the integrator time constant τ1 and the compensation circuit time constant τ1' may be introduced. This causes a minor undershoot, which will help accelerate the settling process still without affecting the amplitude of the pulse, and with a negligible effect on the amplitude of subsequent pulses that arrive shortly after the first pulse.

The values of the parallel resistors are preferably chosen to be such that the time constants τ1 and τ3 are reduced significantly.

The reset generator is not illustrated in FIG. 4, but it is assumed to be connected to control the three two-state switches s1, s2 and s3, such that they change their state in response to a reset signal generated by the reset generator, when the reset generator has detected a peak in the shaped signal. The switches s1, s2, s3 may include holding circuits arranged to retain the "on" mode for a predetermined period after a reset signal pulse has been received, or the state of the switches s1, s2, s3 may simply follow a digital value of the reset signal RS.

The switches s1, s2, s3 may be implemented as electronic switches or logic gates known in the art. However, the switches s1, s2, s3 preferably have a short "on" response time so as to ensure that the pulse shortening is quickly activated in response to the reset signal.

In an alternative embodiment, it may be preferred to reduce the time constants in response to the reset signal by changing the effective capacitances by means of switches in the RC circuits instead of changing the resistances, as illustrated. More alternatively, the capacitances and resistances may both be changed in response to the reset signal by means of appropriately connected switches.

In the circuit of FIG. 4, the charge-sensitive amplifier CSA can be implemented as described e.g. in U.S. Pat. No. 6,587,003 B2. This document describes an amplifier having a JFET input stage and a capacitive feedback element. The amplifier produces an output voltage pulse proportional to a charge pulse deposited at the JFET input by a particle detector. A circuit is connected to the amplifier output and to a source node of the JFET so as to apply a pulsed reset signal to the source node.

Figure 5A:
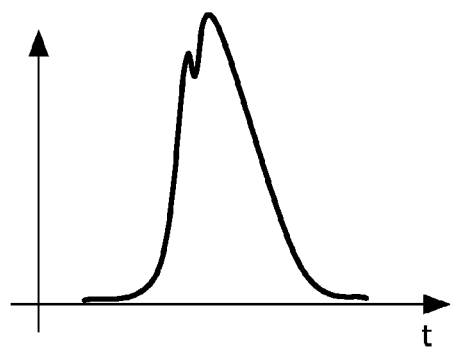
FIG. 5 illustrates examples of closely spaced shortened pulses.
Figure 5B:
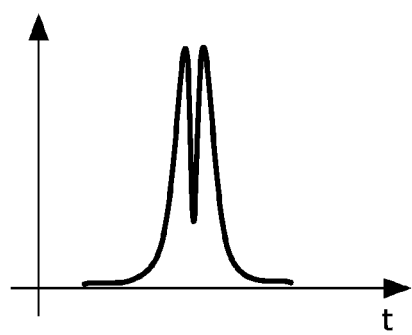

FIG. 5 illustrates examples of waveforms in the shaped signals for two subsequent pulses both representing the same charge and being closely spaced in time t. In part a) of FIG. 5, the shaped signal is depicted for the situation in which there is no reset. In part b) of FIG. 5, the shaped signal is depicted for the situation in which the circuit of FIG. 4 is operational so as to provide a reset upon detection of the first pulse. In part a), the large time constants of the charge-sensitive amplifier and the shaper cause the second pulse to be difficult to discriminate. Furthermore, the pile-up effect causes an error in the amplitude of the second pulse. In part b), in which the reset as described above is activated shortly after the first pulse is detected, the two pulses can easily be discriminated, and the amplitude is seen to be the same for the two pulses as expected because the pulses represent the same charge. The pile-up problem is thus remedied.

Figure 6:
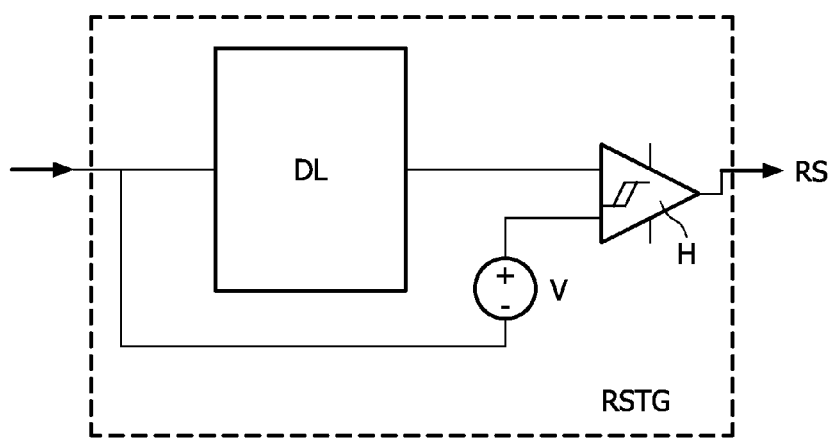
FIG. 6 illustrates an embodiment of a reset generator with an analog implementation.

FIG. 6 illustrates an example of a block diagram of an embodiment of an analog reset generator RSTG. The reset generator RSTG receives the shaped signal from the shaper, and the shaped signal is applied to an analog delay line DL to generate a delayed version of the shaped signal. By using a comparator H, a negative voltage difference can then be detected, which can be used as the reset signal RS. The delayed version of the shaped signal is subtracted from the shaped signal so as to create a representation of a first derivative of the shaped signal. A small DC voltage drop V is added in order to shift the entire level to a small negative derivative value larger than a known low value. This helps create a small delay after the peak has been reached, and ringing in the loop is prevented by negating the reset signal RS earlier than when the full settling time (i.e. zero derivative) has been reached. Another means for protection against ringing is to introduce a small hysteresis in the comparator H, such as the use of a negative edge detector in the form of a Schmitt trigger.

The implementation shown in FIG. 6 is a rather simple circuit that combines peak detection and generation of the reset signal RS which can be directly applied to control the switches s1, s2, s3 of the circuit shown in FIG. 4.

FIGS. 7a and 7b illustrate two optional implementations of generating a reset signal RS in the form of a reset pulse by digital processing DPC after analog-to-digital conversion of the shaped signal SHPS. In both cases, the reset signal RS is generated by post-processing the digitized signals, which are the outputs of the analog-to-digital converter (or discriminator) ADC. In both cases, there is a need for several discrimination levels, sorted by their amplitude, so that small pulses will cause a digital pulse in the lower outputs only and the larger the pulse, the higher the index of the output of this pulse. In FIGS. 7a and 7b, a number of six levels are illustrated for simplicity only. However, fewer or more levels may be used.

In FIG. 7a, the falling edge FE-DCT of each pulse is detected in the second stage. A set/reset flip-flop in the digital processing block DPC is set when a negative edge has been detected in any one of the upper falling edge detectors, excluding the lower one (or several lower levels). When a negative edge is detected in the lower level, or in one of the lower levels, the flip-flop is reset. The output of this flip-flop drives the reset signal RS.

In FIG. 7b, the reset signal pulse RS is generated in response to the rising edge of the incoming pulse. When a positive edge, or rising edge RE-DCT, is detected by any one of the outputs of the analog-to-digital converter or discriminator ADC, the digital processing block DPC generates a reset pulse RS after a pre-defined delay time dly, which delay time dly should be tuned to more than the rise time of the pulse. The reset pulse RS is de-asserted after another pre-defined period of time, which is tuned to provide complete decay of the analog pulse at the output of the shaper.

Certain specific details of the disclosed embodiments are set forth for purposes of explanation rather than limitation, so as to provide a clear and thorough understanding of the present invention. However, it will be evident to those skilled in the art that the present invention may be practiced in other embodiments that do not conform exactly to the details set forth herein, without departing significantly from the spirit and scope of this disclosure. Furthermore, in this context, and for the purposes of brevity and clarity, detailed descriptions of well-known apparatuses, circuits and methodologies have been omitted so as to avoid unnecessary detail and possible confusion.

In summary, the invention provides a particle-counting apparatus which reduces a resulting width of pulses when a charge pulse is received from a particle detector, thereby reducing the well-known pile-up problem with pulses, which problem limits the possible counting rate. Pulse shortening is obtained by resetting the pulse shortly after it exceeds its peak level at the apparatus output. The apparatus includes a charge-sensitive amplifier and a shaper which generates an output for subsequent discrimination circuits.

A reset generator monitors the shaper output and generates a reset signal to the shaper when a peak has been detected. Preferably, the reset signal is also simultaneously applied to the charge-sensitive amplifier. The charge-sensitive amplifier and shaper circuits are then arranged to reduce their integrator time constants when the reset signal is received. The shaper output is thus settled more quickly, and it becomes possible to detect two pulses that are temporally close to each other, thereby enabling a higher particle counting rate. The reset generator can be implemented by analog components or in a digital version in the form of an algorithm to be run on a digital processor. In preferred embodiments, the charge-sensitive amplifier and shaper circuits reduce their respective integrator time constants in response to the reset signal by operating a switch that connects a resistor in parallel with the RC circuits determining the integrator time constants. The effective time constant for the apparatus is thereby reduced and a faster settling is obtained.

This invention is eminently suitable in Computer Tomography X-ray Imaging based on photon counting. This application requires high count-rate photon counting for the acquisition of high-quality and large dynamic range imaging. It also requires multi-spectral capability that will enable imaging of body material with different absorbing characteristics, which is very essential for medical diagnoses. However, the invention is also advantageous for photon-counting, energy-discrimination circuits used in industrial and medical digital fluoroscopy including mammography, and in any instrumentation that requires high-speed photon counting.

Reference signs are included in the claims only for reasons of clarity and should not be construed as limiting the scope of the claims.

The invention claimed is:

1. A particle-counting apparatus arranged to receive an electric input signal from an associated particle detector, the apparatus comprising:
    a charge-sensitive amplifier (CSA) arranged to receive the input signal and generate an amplified signal in response,
    a shaper (SHPR) arranged to receive the amplified signal and generate a shaped signal in response, and
    a reset generator (RSTG) arranged to detect a peak in the shaped signal and generate a reset signal (RS) to the shaper (SHPR) upon detection of the peak, so as to reduce temporal extension of the shaped signal in response to a pulse in the electric input signal.

2. An apparatus according to claim 1, wherein the reset generator (RSTG) further applies a reset signal (RS) to the charge-sensitive amplifier (CSA).

3. An apparatus according to claim 2, wherein the reset generator (RSTG) applies the reset signal (RS) to the shaper (SHPR) and to the charge-sensitive amplifier (CSA) simultaneously.

4. An apparatus according to claim 1, wherein the reset signal (RS) is a pulse.

5. An apparatus according to claim 1, wherein the reset generator (RSTG) includes an analog-to-digital converter (ADC).

6. An apparatus according to claim 5, wherein the analog-to-digital converter (ADC) receives the shaped signal (SHPS) and generates a digital output to a digital processor circuit (DPC) which is then arranged to analyze the shaped signal (SHPS) and generate the reset signal (RS) in response thereto.

7. An apparatus according to claim 5, wherein the analog-to-digital converter (ADC) is a flash analog-to-digital converter or a discriminator.

8. An apparatus according to claim 1, wherein the reset generator (RSTG) includes a delay line (DL) arranged to generate a delayed version of the shaped signal, and a comparator arranged to generate the reset signal (RS) based on comparing the shaped signal and the delayed version of the shaped signal.

9. An apparatus according to claim 8, wherein the comparator includes a hysteresis element (H).

10. An apparatus according to claim 1, wherein the charge-sensitive amplifier (CSA) exhibits a first integrator time constant during normal operation, and wherein the charge-sensitive amplifier (CSA) is arranged to switch to a second integrator time constant in response to the reset signal (RS), the second integrator time constant being shorter than the first integrator time constant.

11. An apparatus according to claim 10, including a switch (s1) arranged to switch between first and second integrator networks in response to the reset signal (RS).

12. An apparatus according to claim 11, wherein the first integrator network ($\tau 1$) includes a first resistor, and wherein the switch (s1) is connected so as to connect or disconnect a second resistor in response to the reset signal (RS).

13. An apparatus according to claim 1, including switches (s1, s2, s3) arranged to change time-constant properties of both the charge-sensitive amplifier (CSA) and the shaper (SHPR) in response to the reset signal (RS).

14. An apparatus according to claim 13, wherein the switches (s1, s2, s3) are arranged to change resistances in respective RC networks for the charge-sensitive amplifier (CSA) and the shaper (SHPR) in response to the reset signal (RS).

15. An apparatus according to claim 13, wherein the time constants of both the charge-sensitive amplifier (CSA) and the shaper (SHPR) are reduced, in response to the reset signal (RS), to significantly shorter time constants than during normal operation.

16. A particle-counting system including
a particle-counting front-end (F), wherein the front-end comprises:
   a charge-sensitive amplifier (CSA) arranged to receive the input signal and generate an amplified signal in response;
   a shaper (SHPR) arranged to receive the amplified signal and generate a shaped signal in response, and
      a reset generator (RSTG) arranged to detect a peak in the shaped signal and generate a reset signal (RS) to the shaper (SHPR) upon detection of the peak so as to reduce temporal extension of the shaped signal in response to a pulse in the electric input signal; and
a counter (CNTR) arranged to receive the shaped signal from the front-end (F) and discriminate between particle pulses based thereon.

17. A particle-counting system according to claim 16, further including a particle detector (DET).

18. A particle-counting system according to claim 17, wherein the particle detector (DET) is a photon detector.

19. A scanner including
a particle-counting system comprising:
   a particle detector;
   a particle-counting front-end (F) comprising:
      a charge-sensitive amplifier (CSA) arranged to receive the input signal and generate an amplified signal in response;
      a shaper (SHPR) arranged to receive the amplified signal and generate a shaped signal in response, and
         a reset generator (RSTG) arranged to detect a peak in the shaped signal and generate a reset signal (RS) to the shaper (SHPR) upon detection of the peak so as to reduce temporal extension of the shaped signal in response to a pulse in the electric input signal;
   a counter (CNTR) arranged to receive the shaped signal from the front-end (F) and discriminate between particle pulses based thereon; and
a signal processor (DSP) arranged to receive a signal from the counter (CNTR) and generate data representing an image based thereon.

20. A scanner according to claim 19, wherein the scanner is one of: a CT scanner and an X-ray scanner.

* * * * *